Feb. 25, 1941. P. J. HARRINGTON Re. 21,725

METHOD AND APPARATUS FOR COUNTERCURRENT WASHING

Original Filed Oct. 20, 1930

INVENTOR.

PAUL J. HARRINGTON

BY

W. E. Cussie ATTORNEY.

Reissued Feb. 25, 1941

Re. 21,725

UNITED STATES PATENT OFFICE 21,725

METHOD AND APPARATUS FOR COUNTER-CURRENT WASHING

Paul J. Harrington, Fanwood, N. J., assignor to Standard Oil Development Company Original No 1,943,822, dated January 16, 1934, Serial No. 489,863, October 20, 1930. Application for reissue April 7, 1938, Serial No. 200,727

6 Claims. (Cl. 23—310)

This invention relates to the countercurrent treatment of fluids. The invention will be fully understood from the following description taken in connection with the accompanying drawing, in which latter Fig. 1 is a longitudinal sectional view of one form of apparatus suitable for carrying out the invention;

Figures 1, 2, 3:
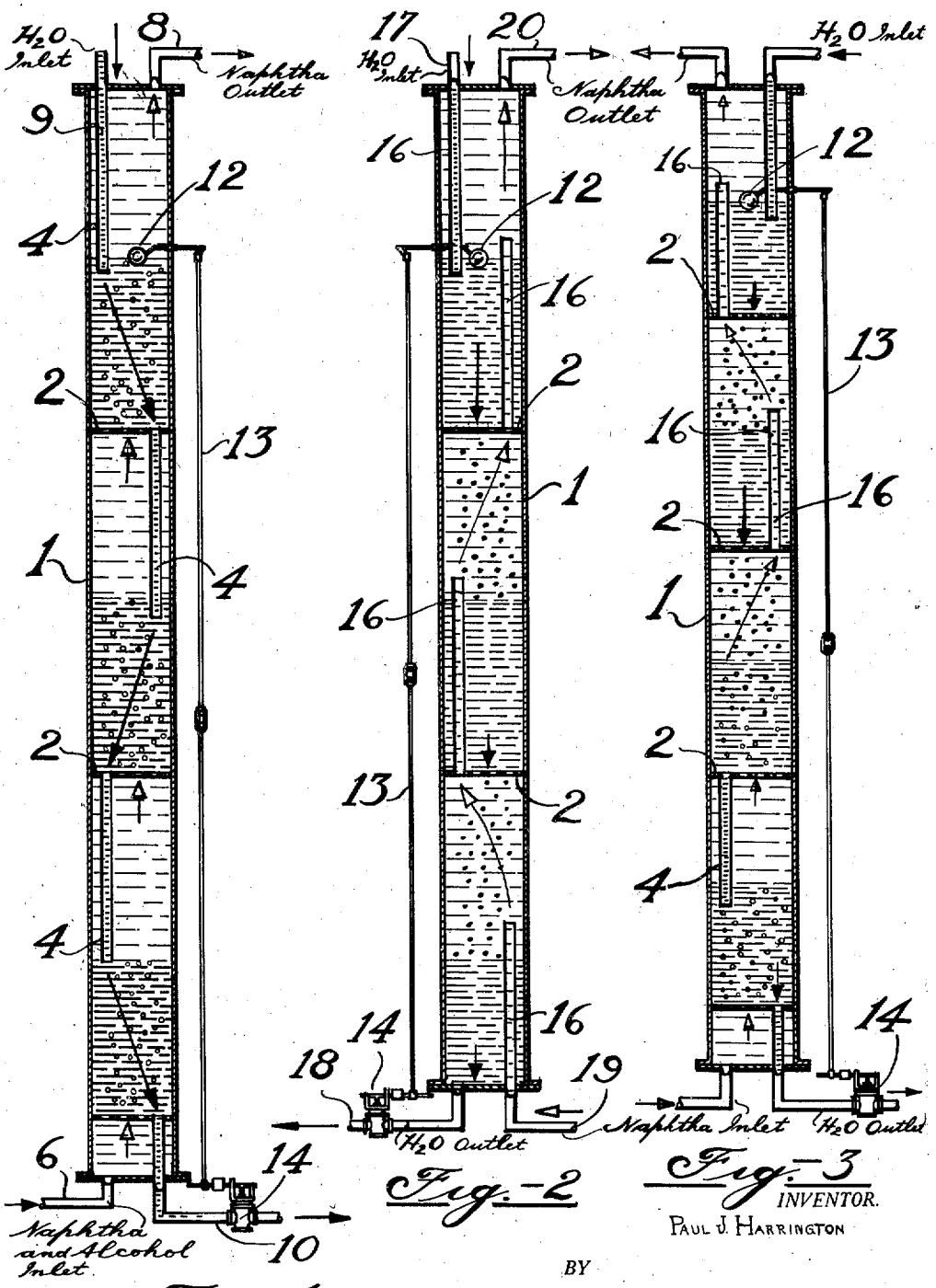
Fig. 2 is a longitudinal sectional view of a modified form of apparatus.
Fig. 3 is a longitudinal sectional view of still another modified form of apparatus.

The invention is directed particularly to the counter-current treatment of immiscible liquids of different gravities and will be described in connection with the counter-current washing with water of mixed alcohol and naphtha.

Referring particularly to Fig. 1 of the drawing, there is shown a tower, the shell of which is designated by reference numeral 1. The shell is divided vertically into sections by means of a plurality of perforated plates 2 which extend substantially horizontally across the tower. A drain pipe 4 extends downwardly from each perforated plate for a substantial distance sufficient to permit the accumulation of a layer of light liquid of sufficient thickness to provide a differential head which will give the spray effect and capacity desired. The relatively light mixture of naphtha and alcohol is passed into the lowermost section through a line 6 at a rate of flow controlled by any suitable means, not shown. The relatively light liquid flows upwardly through the shell and is discharged from the uppermost section through a discharge line 8. The relatively heavy liquid such as water is introduced into the uppermost section through a pipe 9 at a rate of flow controlled by any suitable means, not shown. Pipe 9 preferably opens into approximately the middle portion of the section. The relatively heavy liquid flows downwardly from one section to another through pipes 4 and is discharged from the lowermost section through a line 10. The relatively light liquid flows upwardly from one section to another through the perforation in the plates. The means for controlling the feed of relatively heavy and relatively light liquids into the shell can be a proportional rate of flow controller if desired.

The tower is filled with the counter-currently moving bodies of immiscible liquids of different gravities. The downwardly flowing relatively heavy liquid is fed into the tower at a rate proportional to the discharge through drains 4 and line 10 to cause accumulation of the liquid above each perforated plate in a layer of substantial thickness. This level is maintained by means of a regulating device which comprises a float 12 and members 13 which are connected with a valve 14 in the outlet line 10. Any standard air-actuated or direct acting duo-gravity liquid level control can be used. The depth of the body of water maintained above each perforated plate may, for example, be approximately 3–5 ft. for a tower 2 ft. in diameter.

The relatively light liquid flows upwardly through the tower in sufficient volume to accumulate in a body underneath each perforated plate filling the space between the body of relatively heavy liquid in each section and the perforated plate. The depth of the body of mixed alcohol and naphtha below each plate can be approximately 3–5 ft. for a tower 2 ft. in diameter. Each body of the relatively light liquid is of such thickness that there is sufficient differential head of liquid or driving head occasioned by and proportional to the difference in gravity of the two liquids and the thickness of the lighter liquid layer with the corresponding column of heavy liquid in pipe 4 to cause the streams of relatively light liquid flowing upwardly through the openings of the plates 2 to break up into a myriad of very fine drops forming a spray or mist. The head may be sufficiently great so that with large gravity differences in the liquids and low interface surface tensions between the liquids an actual emulsion of more or less permanency will be formed. The small mist drops are formed whether the perforations of the plate are large or small. The perforations are of such size that efficient commercial operation of the device, with large throughput, can be carried on. The number or size of the holes in the plates of the upper portion of the tower can be changed in order to obtain finer bubbles of the relatively light liquid.

By the method described, transfer of material from one liquid to another is facilitated by the very small bubbles of the one liquid, which give more surface exposed to contact with the other liquid. Also, the time of contact of the two liquids is at a maximum, due to the fact that the bubbles are of extremely small size, and therefore rise through the relatively heavy liquid more slowly. Similarly, the presence of a relatively thick layer of the heavy liquid provides a greater distance through which the lighter liquid must pass while being washed. The tower in which the washing is conducted is continuous and there is a saving in labor, tankage and water.

Referring to Fig. 2 of the drawing a modified form of the apparatus is shown which comprises a shell 1 and perforated plates 2 as previously described. Drain pipes 16 extend upwardly from the perforated plates for a distance sufficient to prevent overflow of the heavy liquid through the pipes, until a body of the liquid of relatively great thickness is accumulated on the plates. This distance can be sufficient to permit the accumulation of a layer of heavy liquid of sufficient thickness to provide a differential head which will give the spray effect and capacity desired. The relatively heavy liquid is introduced into the uppermost section through a conduit 17 which opens into the section at an intermediate portion of the section. The relatively heavy liquid is discharged from the lowermost section through a line 18. The relatively light liquid is introduced into an intermediate portion of the lowermost section through a line 19. The rate of feed of the relatively light and relatively heavy liquids into the shell is controlled as previously described in connection with Fig. 1. The upwardly flowing lighter liquid accumulates under each perforated plate as previously described and flows through each drain pipe 16 into a body of the lighter liquid accumulating under an upper plate. The relatively light liquid is discharged from the uppermost section through a line 20. The descending water is forced to collect above each plate until there is sufficient head to force the water through the plate holes in the form of drops of spray which fall through the naphtha layer and unite on the next lower plate to complete the cycle.

As a result of this construction, it is possible to reduce the resistance of the liquid film of either liquid at will by making the other liquid the dispersed phase. The washing operation is a diffusional process depending for its rate of transfer of solute from one solvent to the other not only on the available concentration difference and surface exposed, but also on the resistance to diffusion of the films of liquid on each side of the liquid interface. The resistance of these films varies greatly with the nature of the liquid so that in many cases one film offers much the greater resistance.

It will be understood that there can be combined in one shell the type of section shown in Fig. 1 in which dispersion of the relatively light liquid in the heavier liquid is effected and the type of section shown in Fig. 2 in which dispersion of the relatively heavy liquid in the lighter liquid is effected. These sections can be combined in any number or combination to secure the desired result. For example, they can be disposed alternately, or with the type of section shown in Fig. 2 in the upper portion of the shell and the type of section shown in Fig. 1 in the lower portion of the shell. Any other desired arrangement can be used and some of the advantages of the invention will be retained.

Referring to Fig. 3 of the drawing, a construction of washing tower is shown in which countercurrent passage of the liquids successively through each other in the form of a myriad of fine drops is effected. In this device one or more sections are provided in which the upper perforated plate is provided with an upwardly extending drain pipe 16 as previously described. The lower perforated plate of the given section is provided with a downwardly extending drain pipe 4 as previously described. The relatively heavy liquid flows downwardly through the sections and accumulates upon the upper perforated plate of a given section and is discharged through the perforations in a myriad of fine bubbles through the relatively light liquid which has accumulated beneath this plate. The relatively light liquid passes upwardly through the tower and accumulates under the lower perforated plate of the given section and is discharged into the relatively heavy liquid on the upper side of this plate in a myriad of fine drops which accumulate in the upper portion of this section.

It is contemplated to facilitate the carrying out of the process by incorporating ingredients into one or both liquids which will change the surface tensions of, or interface surface tension between the liquids. For example, in the case given, soaps, alcohols or the like may be added to the fresh water in small amounts, reducing its surface tension and reducing the interface surface tension between naphtha and water. With the same head the energy available (due to loss of head in passing through the holes in the plate) will result in the generation of greater surface, or the formation of smaller droplets.

While the invention has been described as applied to the washing of mixed alcohol and naphtha with water, it will be understood that it can be used for washing naphtha with caustic, for treating distillates with acid for extracting oils with phenol, or with liquid sulphur dioxide, or for any other purposes in which a plurality of immiscible liquids of different gravities are to be washed. By the counter-current treatment described the best concentration differential or differential driving force possible can be obtained between the liquids involved. For example, if fresh water is contacted with fairly well-washed naphtha and water containing a good deal of alcohol with the naphtha alcohol mixture richest in alcohol, there is maintained the best concentration differential or differential driving force possible. At the same time a minimum of water is used and there is produced a strong water alcohol solution and well washed naphtha.

Various changes may be made within the scope of the appended claims, in which it is desired to claim all novelty inherent in the invention as broadly as the prior art permits.

I claim:

1. In a vertical tower for countercurrently contacting two liquids which differ in specific gravity and are at least partially immiscible with each other, at least two horizontal perforated plates disposed in said chamber in spaced relation forming a plurality of chambers, a tubular conduit disposed in each chamber extending vertically into each chamber, said tubular member being disposed in closer proximity to one wall of said tower than the other wall, the said tubular member being adapted to convey the liquid from one chamber to the adjacent chamber, the said horizontal perforated partitions in said tower being so constructed that pools of heavy liquid accumulate above each horizontal perforated partition and pools of light liquid below each horizontal perforated partition, which liquids are in contact with the horizontal perforated partitions, the tubular conduits disposed in each chamber being supported by the said horizontal perforated partitions and extending vertically from the said horizontal perforated partition and adapted for conveying one of the liquids from one side of the said horizontal perforated partition through the pools of the other liquid and out of contact with the other liquid in a direct line of flow for a distance sufficient to create a pressure to force the other liquid through the perforation of the horizontal perforated partition with sufficient head that it breaks up into a myriad of very fine drops as it passes through the pool of the other liquid.

2. In a vertical tower for countercurrently contacting two liquids which differ in specific gravity and are at least partially immiscible with each other, at least two horizontal perforated plates disposed in said chamber in spaced relation forming a plurality of chambers, a tubular conduit disposed in each chamber extending vertically into each chamber, said tubular member being disposed in closer proximity to one wall of said tower than the other wall, the said tubular member being adapted to convey the liquid from one chamber to the adjacent chamber, the said horizontal perforated partitions in said tower being so constructed that pools of heavy liquid accumulate above each horizontal perforated partition and pools of light liquid below each horizontal perforated partition, which liquids are in contact with the horizontal perforated partitions, the tubular conduits disposed in each chamber being supported by the said horizontal perforated partitions and extending downwardly from the said horizontal perforated partition and adapted for conveying the heavy liquid from the upper side of the said horizontal perforated partitions through the pools of the lighter liquid and out of contact with it in a direct line of flow for a distance sufficient to create a pressure to force the other liquid through the perforation of the horizontal perforated partition with sufficient head that it breaks up into a myriad of very fine drops as it passes through the pool of the other liquid.

3. In a vertical tower for countercurrently contacting two liquids which differ in specific gravity and are at least partially immiscible with each other, at least two horizontal perforated plates disposed in said chamber in spaced relation forming a plurality of chambers, a tubular conduit disposed in each chamber extending vertically into each chamber, said tubular member being disposed in closer proximity to one wall of said tower than the other wall, the said tubular member being adapted to convey the liquid from one chamber to the adjacent chamber, the said horizontal perforated partitions in said tower being so constructed that pools of heavy liquid accumulate above each horizontal perforated partition and pools of light liquid below each horizontal perforated partition, which liquids are in contact with the horizontal perforated partitions, the tubular conduits disposed in each chamber being supported by the said horizontal perforated partitions and extending upwardly from the said horizontal perforated partition and adapted for conveying the light liquid from the lower side of the said horizontal perforated partitions through pools of the heavy liquid and out of contact with the other liquid in a direct line of flow for a distance sufficient to create a pressure to force the other liquid through the perforation of the horizontal perforated partition with sufficient head that it breaks up into a myriad of very fine drops as it passes through the pool of the other liquid.

4. The method of countercurrently washing two liquids which differ in specific gravity and are at least partially immiscible with each other in superimposed zones separated by perforated partitions, which comprises passing a relatively heavy liquid into the upper zone whereby the heavy liquid accumulates to form a body of liquid upon the perforated partition, passing a relatively light liquid into the lower zone whereby the light liquid rises to the perforated partition to form a continuous body of light liquid below the said perforated partition, passing one of the liquids in a confined stream in a direct line of flow through the body of the other liquid and out of contact with it, a distance sufficient to create a pressure to force the other liquid through the perforation of the said perforated partition with sufficient head that it breaks up into a myriad of very fine drops as its passes through the body of the other liquid.

5. The method of countercurrently washing two liquids which differ in specific gravity and are at least partially immiscible with each other in superimposed zones separated by perforated partitions, which comprises passing a relatively heavy liquid into the upper zone whereby the heavy liquid accumulates to form a body of liquid upon the perforated partition, passing a relatively light liquid into the lower zone whereby the light liquid rises to the perforated partition to form a continuous body of light liquid below the said perforated partition, passing the heavy liquid in a confined stream in a direct line of flow through the body of the other liquid and out of contact with it, a distance sufficient to create a pressure to force the other liquid through the perforation of the said perforated partition with sufficient head that it breaks up into a myriad of very fine drops as its passes through the body of the other liquid.

6. The method of countercurrently washing two liquids which differ in specific gravity and are at least partially immiscible with each other in superimposed zones separated by perforated partitions, which comprises passing a relatively heavy liquid into the upper zone whereby the heavy liquid accumulates to form a body of liquid upon the perforated partition, passing a relatively light liquid into the lower zone whereby the light liquid rises to the perforated partition to form a continuous body of light liquid below the said perforated partition, passing the light liquid in a confined stream in a direct line of flow through the body of the other liquid and out of contact with it, a distance sufficient to create a pressure to force the other liquid through the perforation of the said perforated partition with sufficient head that it breaks up into a myriad of very fine drops as its passes through the body of the other liquid.

PAUL J. HARRINGTON.